(12) United States Patent
Birkett et al.

(10) Patent No.: US 8,976,302 B2
(45) Date of Patent: Mar. 10, 2015

(54) RADIO FREQUENCY FRONT END FOR TELEVISION BAND RECEIVER AND SPECTRUM SENSOR

(75) Inventors: Neil Birkett, Manotick (CA); Vajira Samarasooriya, Ottawa (CA); Jung Yee, Ottawa (CA)

(73) Assignee: Wi-LAN, Inc., Ottawa (CA)

( * ) Notice: Subject to any disclaimer, the term of this patent is extended or adjusted under 35 U.S.C. 154(b) by 0 days.

(21) Appl. No.: 13/429,205

(22) Filed: Mar. 23, 2012

(65) Prior Publication Data

US 2012/0182430 A1 Jul. 19, 2012

Related U.S. Application Data

(63) Continuation-in-part of application No. 12/571,153, filed on Sep. 30, 2009, now Pat. No. 8,350,970.

(51) Int. Cl.
*H04N 5/50* (2006.01)

(52) U.S. Cl.
USPC ........... 348/731; 348/180; 348/192; 348/725; 455/161.1; 455/161.3; 455/118; 455/120; 455/123; 455/130

(58) Field of Classification Search
USPC ................. 348/180, 707, 572, 731, 192, 725; 455/130, 180.2, 188.1, 120, 189.1, 455/161.1, 161.3, 226.1, 118, 123
See application file for complete search history.

(56) References Cited

U.S. PATENT DOCUMENTS

| | | | |
|---|---|---|---|
| 4,520,507 A * | 5/1985 | Moon .......................... | 725/151 |
| 6,307,897 B1 | 10/2001 | Ohta et al. | |
| 6,678,512 B1 | 1/2004 | Kaminski et al. | |
| 6,977,555 B2 * | 12/2005 | Kotera et al. ................. | 330/305 |
| 7,483,711 B2 | 1/2009 | Burchfiel | |
| 7,738,046 B2 | 6/2010 | Keate et al. | |
| 7,830,456 B1 | 11/2010 | Vysyaraju et al. | |
| 7,860,189 B2 * | 12/2010 | Petilli et al. ................... | 375/316 |
| 2005/0003785 A1 | 1/2005 | Jackson et al. | |
| 2006/0222115 A1 * | 10/2006 | Dornbusch et al. ........... | 375/345 |
| 2007/0030929 A1 * | 2/2007 | Gao et al. ....................... | 375/345 |
| 2007/0126508 A1 * | 6/2007 | Montemayor et al. ........ | 330/284 |
| 2007/0153878 A1 * | 7/2007 | Filipovic ....................... | 375/147 |
| 2007/0207759 A1 * | 9/2007 | Vavelidis et al. .......... | 455/232.1 |

(Continued)

FOREIGN PATENT DOCUMENTS

| CN | 201039094 Y | 3/2008 |
|---|---|---|
| EP | 1148653 A1 | 10/2001 |

(Continued)

OTHER PUBLICATIONS

Office Action for related CN Patent Application No. 201080037667.9, mailed on Feb. 26, 2014, in 11 pages, together with search report and English translation thereof.

(Continued)

*Primary Examiner* — Jefferey Harold
*Assistant Examiner* — Humam Satti
(74) *Attorney, Agent, or Firm* — Procopio, Cory, Hargreaves & Savitch LLP

(57) ABSTRACT

A radio frequency front end for a television band receiver and spectrum sensor includes a low noise amplifier that amplifies a received signal output of a radio frequency antenna connected to the radio frequency front end, a pin diode attenuator circuit that selectively attenuates an output of the low noise amplifier, and a buffer amplifier that amplifies an output of the pin diode attenuator.

38 Claims, 18 Drawing Sheets

(56) References Cited

U.S. PATENT DOCUMENTS

| | | | |
|---|---|---|---|
| 2008/0096509 A1* | 4/2008 | Ling | 455/273 |
| 2008/0181337 A1* | 7/2008 | Maxim | 375/340 |
| 2008/0204148 A1* | 8/2008 | Kim et al. | 330/306 |
| 2008/0291985 A1* | 11/2008 | Adnani et al. | 375/220 |
| 2008/0293353 A1 | 11/2008 | Mody et al. | |
| 2009/0135970 A1* | 5/2009 | Miyagi et al. | 375/345 |
| 2009/0180403 A1 | 7/2009 | Tudosoiu | |
| 2010/0130158 A1 | 5/2010 | Khoini-Poorfard et al. | |

FOREIGN PATENT DOCUMENTS

| | | |
|---|---|---|
| JP | 2003-527014 A | 9/2003 |
| JP | 2005-507617 A | 3/2005 |
| JP | 2005-203935 A | 7/2005 |
| JP | 2006-217127 A | 8/2006 |
| JP | 2007-036445 A | 2/2007 |
| JP | 2007-306662 A | 11/2007 |
| WO | 2006/127983 A2 | 11/2006 |
| WO | 2007/135639 A1 | 11/2007 |
| WO | 2008/049114 A1 | 4/2008 |
| WO | 2008/103757 A1 | 8/2008 |
| WO | 2009103348 A1 | 8/2009 |

OTHER PUBLICATIONS

International Search Report and Written Opinion issued on Feb. 16, 2011, in corresponding application No. PCT/CA2010/001515, 9 pages.

Extended European Search Report dated Dec. 20, 2013 for related EP Patent Application No. 10819763.3, in 10 pages.

Office Action dated Apr. 1, 2014 for related JP Patent Application No. JP 2012-531190 in 6 pages.

Office Action dated Oct. 28, 2014 for related JP Patent Application No. 2012-531190 in 8 pages.

* cited by examiner

RADIO FREQUENCY FRONT END FOR TELEVISION BAND RECEIVER AND SPECTRUM SENSOR

RELATED APPLICATIONS

This is a continuation-in-part of U.S. patent application Ser. No. 12/571,153 filed on Sep. 30, 2009.

FIELD OF THE INVENTION

This invention relates in general to cognitive radio and, in particular, to a radio frequency front end for a television band receiver and spectrum sensor that determines vacant bands (white spaces) within the VHF/UHF TV band spectrum.

BACKGROUND OF THE INVENTION

The opening of unused TV band spectrum for usage by unlicensed TV band devices has created a requirement for a television band spectrum that can dynamically indentify white spaces within the VHF/UHF TV band spectrum.

Sensing white spaces within the VHF/UHF TV band spectrum is a vital issue for the operation of unlicensed TV band devices. Protection of licensed incumbent operators such as DTV broadcasters and wireless microphone operators is mandated by the Federal Communications Commission (FCC). The sensing requirements mandated by the FCC are quite stringent, and requires that the TV band device be provided with information about the quality of the available white space to allow the TV band device to utilize that white space efficiently. Because of the FCC's stringent sensing threshold (−114 dB), sensing the television band spectrum for available white space is an extremely challenging task to perform at reasonable cost. Existing low cost technology such as the standard television tuner cannot meet the FCC sensing threshold.

There therefore exists a need for a radio frequency front end for a television band receiver and spectrum sensor for identifying white spaces within the VHF/UHF TV band spectrum.

SUMMARY OF THE INVENTION

It is therefore an object of the invention to provide a radio frequency front end for a television band receiver and spectrum sensor for identifying white spaces within the VHF/UHF TV band spectrum.

The invention therefore provides a radio frequency front end for a television band receiver and spectrum sensor, comprising: a first plurality of adaptive matching networks adapted to be respectively connected to a respective one of a first plurality of antennas; a second plurality of downconverter/tuners connected to the first plurality of adaptive matching networks; and at least one analog to digital converter that converts output of the second plurality of downconverter/tuners into a digital signal.

The invention further provides an adaptive matching network for a radio frequency front end, comprising: an impedance translation circuit adapted to translate an impedance of one of a first plurality of antennas into a respective different impedance; a pin diode attenuator that is controlled to attenuate strong signals received by the one of the plurality of antennas; a shunt resonant circuit to inhibit a received signal band of interest from shunting to ground; and a series resonant circuit for boosting the received signal band of interest.

The invention yet further provides radio frequency front end for a television band receiver and spectrum sensor, comprising: at least two adaptive matching networks respectively adapted to be connected to a respective antenna; a signal summer that combines received signals output by the at least two adaptive matching networks and outputs a combined signal; at least two downconverter/tuners that respectively receive the combined signal; and at least two analog to digital converters that respectively convert an output of one of the at least two respective downconverter/tuners into a digital signal passed to the television band receiver and spectrum sensor.

The invention still further provides a radio frequency front end for a television band receiver and spectrum sensor, comprising: at least two antennas; a first signal summer that combines signals received by the at least two antennas and outputs a combined signal; at least two downconverter/tuners that respectively receive the combined signal; a second signal summer that combines an output of each of the at least two downconverter/tuners into a combined tuner signal; and an analog to digital converter that converts the combined tuner signal into a digital signal passed to the television band receiver and spectrum sensor.

The invention still yet further provides a method of sensing a television band for white space, comprising: dynamically tuning each of a first plurality of antennas to selectively receive a predetermined piece of television band spectrum; passing the pieces of television band spectrum to a second plurality of downconverter/tuners that receive the pieces of television band spectrum; converting an output of each of the second plurality of downconverter/tuners into a digital signal; and passing the digital signal to a spectrum sensor that searches the digital signal for the white space.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

The invention provides a radio frequency front end for a television band receiver provisioned with a television band receiver and spectrum sensor for identifying television band white spaces. The radio frequency front end has at least two antenna adaptive matching networks that are each connected to a respective antenna. The adaptive matching networks are collectively connected to a signal summer that combines the output of each adaptive matching network into a combined signal that is distributed to two or more parallel downcoverters/tuners (DC/tuner). Each DC/tuner is controlled to select a different piece of the combined signal. An intermediate frequency output by each DC/tuner may be fed to respective analog to digital (A/D) converter or combined and fed to a single (A/D) converter. A digital signal output by the A/D converter(s) is passed to a television band receiver and spectrum sensor that identifies television band white spaces in the spectrum pieces that are selected.

Figure 1A:
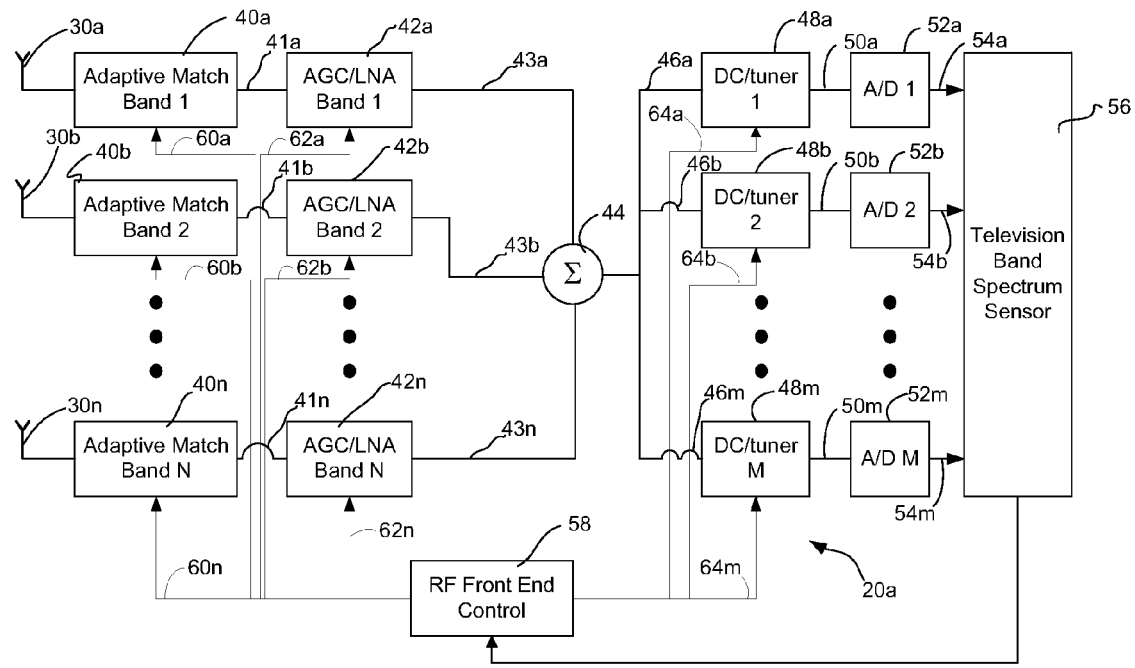
FIG. 1a is a schematic diagram of one embodiment of a radio frequency front end in accordance with the invention for a television band receiver provisioned with a sensor for identifying television band white spaces.

FIG. 1a is a schematic diagram of one embodiment of a radio frequency front end 20a in accordance with the invention for a television band receiver provisioned with a television band receiver and spectrum sensor 56 for identifying television band white spaces. In accordance with the invention, the radio frequency (RF) front end 20a is connected to a plurality of antennas 30a-30n. As understood by those skilled in the art, the number of antennas 30a-30n is dependent on the range of spectrum to be searched for white spaces, which may all or any part of the range from 50-700 MHz. As also understood by those skilled in the art, the type and configuration of each antenna 30a-30n is based both on the spectrum of interest as well as design choice, as will be explained below in more detail with reference to FIG. 7.

Each antenna 30a-30n is connected to a respective adaptive matching network 40a-40n of the RF front end 20. Each adaptive matching network 40a-40n can be selectively and dynamically tuned to a desired frequency within a receiver range of the corresponding antenna 30a-30n by a RF front end control 58 using signal lines 60a-60n, as will be explained below in more detail with reference to FIG. 8. The RF front end control 58 responds to instructions received from a television band spectrum sensor 56, which may be implemented in any one of many ways known in the art. The television band spectrum sensor 56 is not within the scope of this invention.

Output from each adaptive matching network 40a-40n is passed via a respective connection 41a-41n to an automatic gain controller (AGC) and a low noise amplifier (LNA) circuit 42a-42n. As will be further explained below with reference to FIG. 7, the purpose of the AGC/LNA circuits 42a-42n is to balance signals received by the respective antennas 30a-30n so that weak signals (e.g. wireless microphone and other narrowband signals) are not drowned out by strong signals (e.g. DTV broadcasts originating in close proximity to the RF front end 20). The automatic gain controller is regulated by an automatic gain control threshold voltage that is supplied to the AGC/LNA circuits 42a-42n by the RF front end control 58 via respective control circuits 62a-62n, as will also be explained in more detail below with reference to FIG. 7. Output of each AGC/LNA circuit 42a-42n is passed via respective connections 43a-43n to a signal summer (combiner) 44, which may be may be implemented, for example, as a resistor network that is known in the art. The combined signal is output via respective connections 46a-46m to a plurality of downconverter/tuners (DC/tuners) 48a-48m. The number of DC/tuners 48a-48m is independent of the number of adaptive matching networks 40a-40n, and there is no requirement for a 1 to 1 correspondence between the two. In one embodiment of the invention, the DC/tuners 48a-48m are DTV tuner integrated circuits (ICs) available from Infineon Technologies AG under part number TUA-8045.

Each DC/tuner 48a-48m is controlled by the RF front end control 58 via connections 64a-64m to select (tune to) a particular RF frequency generally having a bandwidth of about 6-8 MHz. The RF frequency to be selected by each DC/tuner 48a-48m is dictated by the television band spectrum sensor 56, and communicated to the DC/tuner 48a-48m by the RF front end control 58 via signal connections 62a-62n. The DC/tuner 48a-48m down converts the RF frequency to an intermediate frequency (IF) suitable for digitization, in a manner well known in the art. The IF output by the DC/tuner 46a-46m is conducted via a respective connection 50a-50m to an analog-to-digital (A/D) converter 52a-52m. The IF is sampled by the respective (A/D) converters 52a-52m at a predetermined sampling rate (generally 2-4 times the ATSC symbol rate) to produce a digital representation of the IF signal, which is output via respective connections 54a-54m to the television band spectrum sensor 56.

Figure 1B:
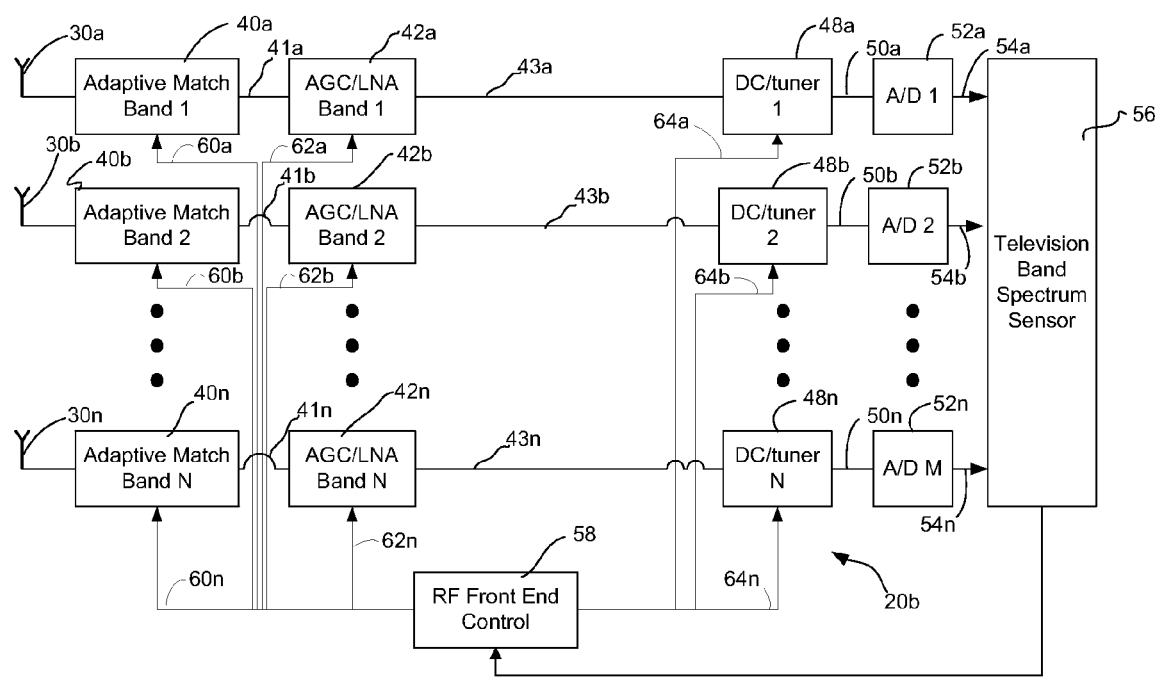
FIG. 1b is a schematic diagram of another embodiment of a radio frequency front end in accordance with the invention for a television band receiver provisioned with a sensor for identifying television band white spaces.

FIG. 1b is a schematic diagram of another embodiment of a radio frequency front end 20b in accordance with the invention. In this embodiment, the number of downconverter/tuners 46a-n is equal to the number of adaptive matching networks 40a-n. Consequently, the signal summer 44 described above with reference to FIG. 1a is not required and there is a direct connection between each AGC/LNA circuit 42a-42n and the corresponding downconverter/tuner 48a-48n. Otherwise, the radio frequency from end 20b is identical to that described above with reference to FIG. 1a. It should be understood that Although this configuration is not repeated for each of the embodiments described below with reference to FIGS. 2-6, any one of those embodiments can be constructed as shown in FIG. 1b so long as the number of downconverter/tuners is equal to the number of adaptive matching networks, and hence the number of antennas connected to the RF front end.

Figure 2:
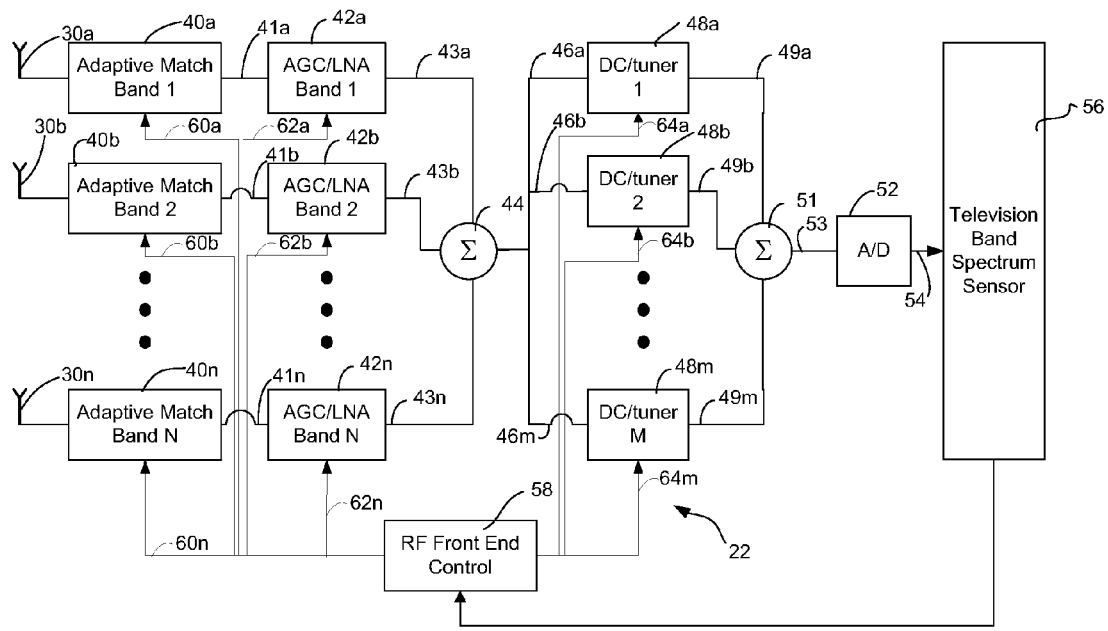
FIG. 2 is a schematic diagram of yet another embodiment of a radio frequency front end in accordance with the invention for a television band receiver provisioned with a sensor for identifying television band white spaces.

FIG. 2 is a schematic diagram of another embodiment of a radio frequency front end 22 in accordance with the invention. The RF front end 22 is identical to the embodiment described above with reference to FIG. 1a with an exception that the outputs of the DC/tuner 48a-48m are routed via respective connections 49a-49m to an IF summer (IF combiner) 51, which may be implemented in the same way as the signal summer 44 described above with reference to FIG. 1a. The combined IF signal is passed via a connection 53 to an A/D converter 52, which samples the combined IF signal at the predetermined sampling rate and outputs a digital representation of the combined IF signal via connection 54 to the television band spectrum sensor 56.

Figure 3:
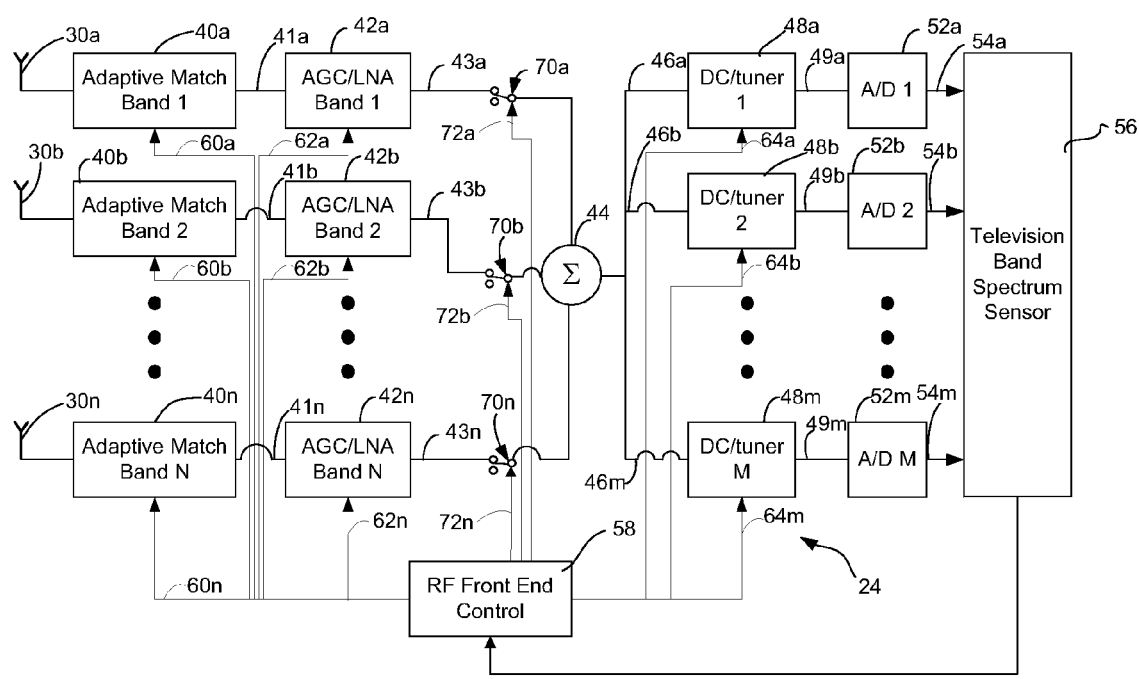
FIG. 3 is a schematic diagram of still another embodiment of a radio frequency front end in accordance with the invention for a television band receiver provisioned with a sensor for identifying television band white spaces.

FIG. 3 is a schematic diagram of yet another embodiment of a radio frequency front end 24 in accordance with the invention. The RF front end 24 is identical to the embodiment described above with reference to FIG. 1a, with an exception that the output from each of the antennas 30a-30n may be shunted to ground (disabled) by a respective switch 70a-70n for any one or more of a number of reasons determined by the television band spectrum sensor 56. The switches 70a-70n are controlled by the RF front end control 58, under direction of the television band spectrum sensor 56, using respective connections 72a-72n to apply a control voltage in a manner known in the art.

Figure 4:
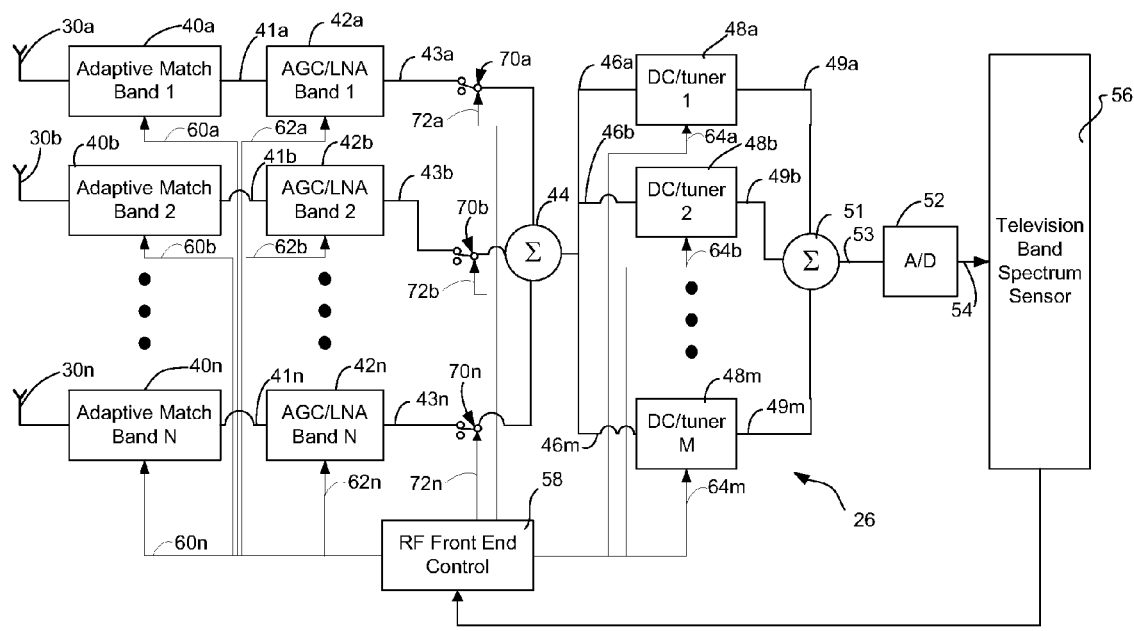
FIG. 4 is a schematic diagram of a further embodiment of a radio frequency front end in accordance with the invention for a television band receiver provisioned with a sensor for identifying television band white spaces.

FIG. 4 is a schematic diagram of yet a further embodiment of a radio frequency front end 26 in accordance with the invention. The RF front end 26 is identical to the embodiment described above with reference to FIG. 3, with an exception that output of the DC/tuner 48a-48m is routed to the IF signal summer 51 and digitized by the (A/D) converter 52, as described above with reference to FIG. 2.

Figure 5:
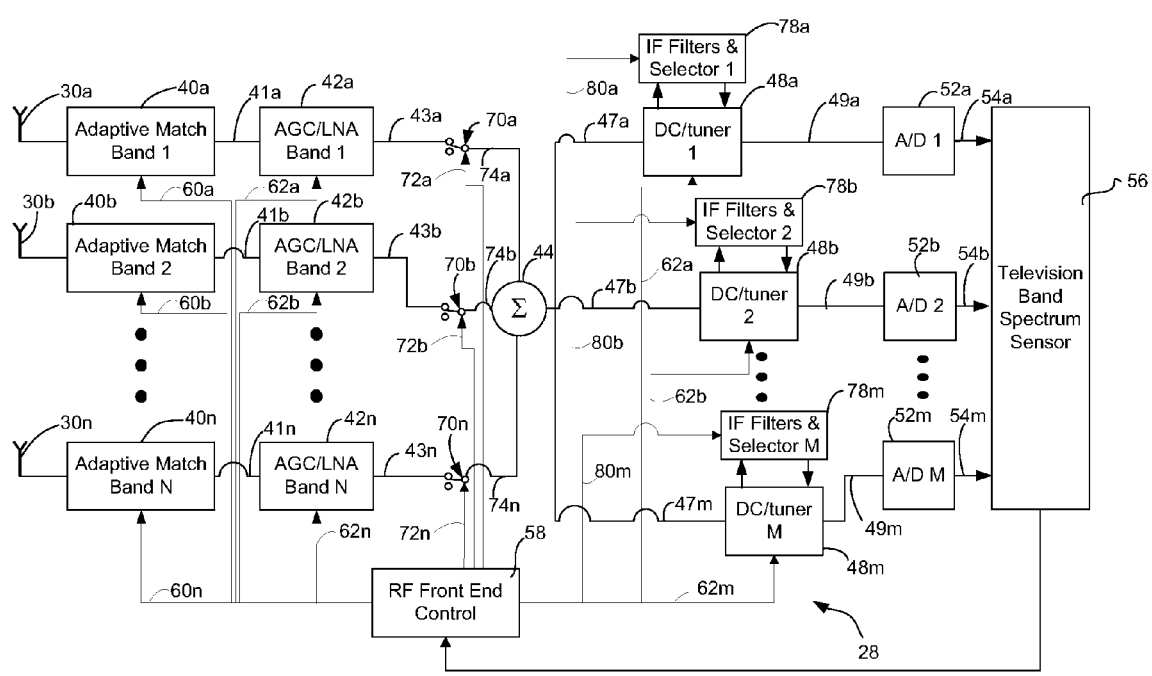
FIG. 5 is a schematic diagram of yet further embodiment of a radio frequency front end in accordance with the invention for a television band receiver provisioned with a sensor for identifying television band white spaces.

FIG. 5 is a schematic diagram of still a further embodiment of a radio frequency front end 28 in accordance with the invention. The RF front end 28 is identical to the embodiment described above with reference to FIG. 4, with an exception that operation of the respective DC/tuner 48a-48m is further enhanced by the addition of IF filters and IF filter selectors 78a-78m. Each group of IF filters and the associated IF filter selector 78a-78m receives an IF signal output by the associated DC/tuner 48a-48m and passes the IF signal through a selected IF filter, as will be explained below in more detail with reference to FIG. 7. The filtered IF signal is routed back to the DC/tuner 48a-48m, which may further down convert the IF signal before it is passed to the associated A/D converter 52a-52m as described above with reference to FIG. 1a. The selection of the appropriate IF filter by an IF filter selector is controlled by the RF front end control 58, under the direction of the television band spectrum sensor 56, using signal connections 80a-80m.

Figure 6:
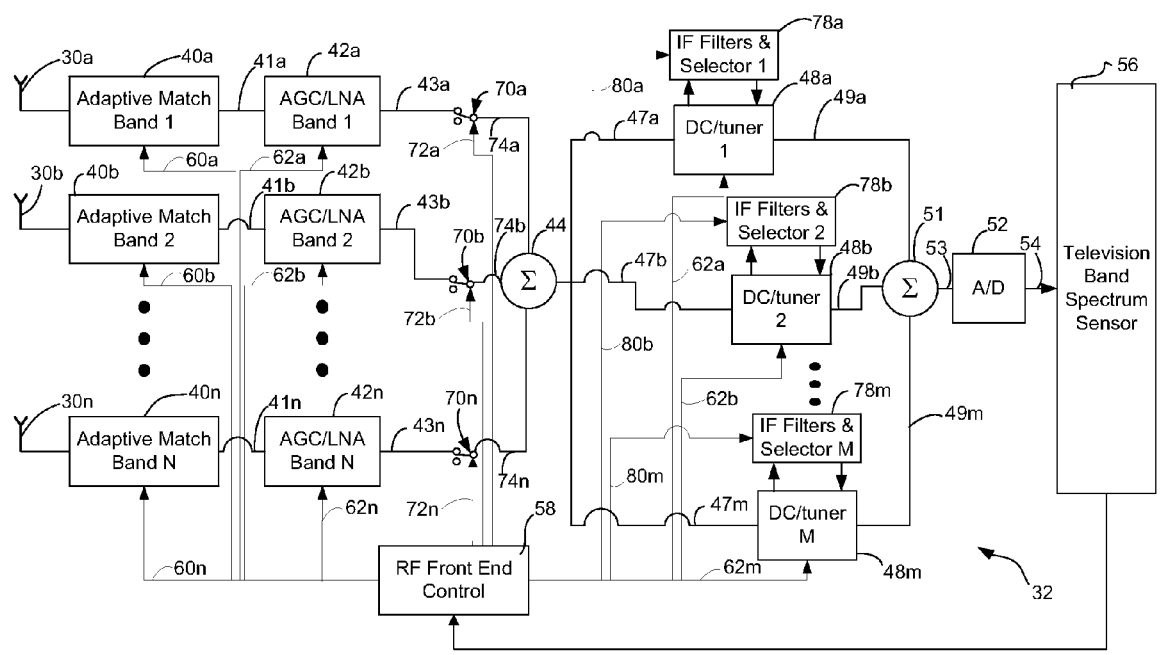
FIG. 6 is a schematic diagram of another embodiment of a radio frequency front end in accordance with the invention for a television band receiver provisioned with a sensor for identifying television band white spaces.

FIG. 6 is a schematic diagram of yet one more embodiment of a radio frequency front end 32 in accordance with the invention. The RF front end 32 is identical to the embodiment described above with reference to FIG. 5, with an exception that output of the DC/tuner 48a-48m is routed to the IF signal summer 51 and digitized by the (A/D) converter 52, as described above with reference to FIG. 2.

Figure 7:
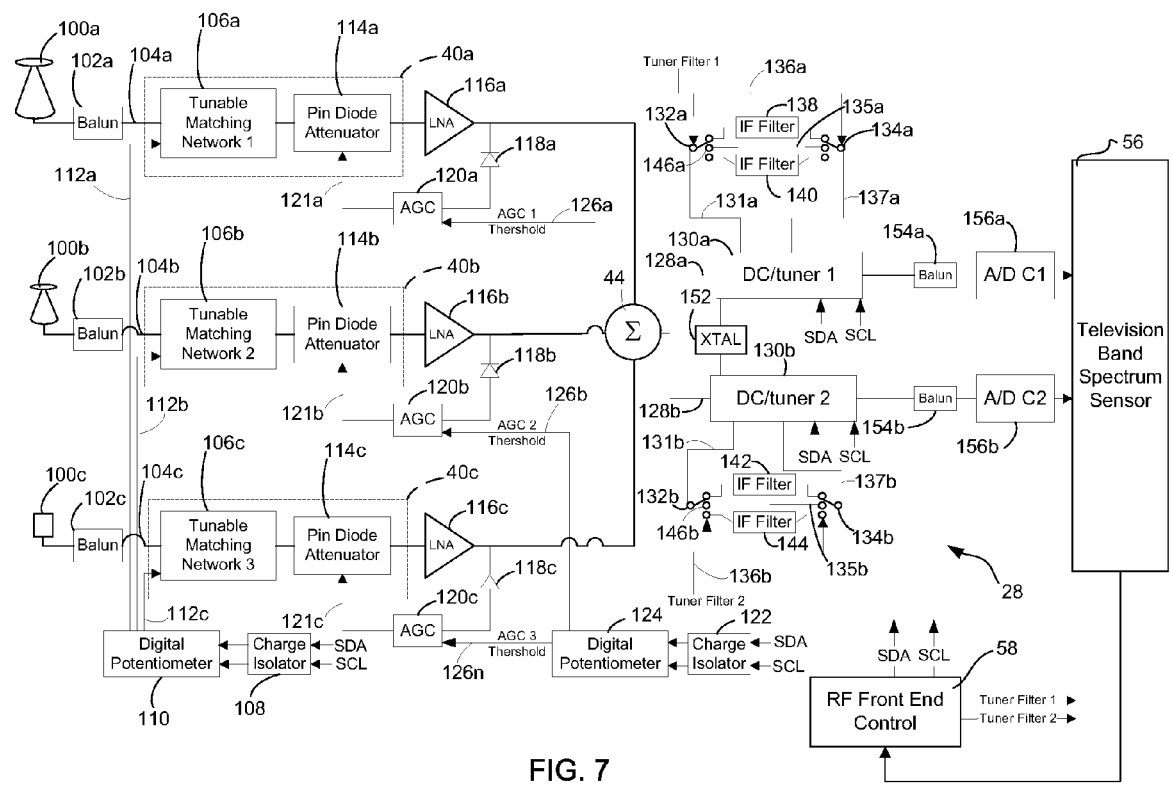
FIG. 7 is a schematic diagram of one implementation of the radio frequency front end shown in FIG. 5.

FIG. 7 is a schematic diagram of one implementation of the radio frequency front end 28 shown in FIG. 5. In this implementation, the RF front end 28 is connected to three antennas 100a, 100b and 100c. The antennas 100a and 100b are disc-cone antennas, well known in the art. Antenna 100a can be dynamically tuned, for example, to receive signals in the 50 MHz-150 MHz range. Antenna 100b can be dynamically tuned, for example, to receive signals in the 150 MHz-350 MHz range. Antenna 100c is, for example, a simple loop antenna which can be dynamically tuned to receive signals in the 350 MHz-700 MHz range. The respective antennas 100a-100c are connected to a respective balun 102a-102c, which converts the balanced antenna output to an unbalanced signal, in a manner well known in the art. Each balun 102a-102c is coupled via a connector 104a-104c to a respective adaptive matching network 40a-40c of the RF front end 28. The adaptive matching networks 40a-40c respectively include a tunable matching network 106a-106c and a pin diode attenuator 114a-114c, an exemplary structure and function of adaptive matching networks 40a-40c will be described below with reference to FIG. 8.

Each tunable matching network 106a-106c is dynamically tuned, as will be explained below with reference to FIG. 8, by a control voltage applied via control lines 112a-112c by a digital potentiometer 110, the construction and function of which is know in the art. The digital potentiometer 110 is coupled via a charge isolator 108 to a data line (SDA) and a data clock line (SCL) coupled to the RF front end control 58. The RF front end control 58 provides data to the digital potentiometer 110 to regulate the respective control voltages supplied to the tunable matching networks 106a-106b. Output from the adaptive matching networks 40a-40c flows to a respective low noise amplifier (LNA) 116a-116c, which provides a 20-30 bB gain to the output signal. Output of the respective LNAs 116a-116c is fed back through a respective diode 118a-118c to an automatic gain controller (AGC) 120a-120c, which compares the feedback to an AGC threshold voltage applied via control lines 126a-126c by a digital potentiometer 124. The digital potentiometer 124 is coupled to the RF front end control 58 through a charge isolator 122 to the data line (SDA) and the data clock line (SCL). The RF front end control 58 provides data to the digital potentiometer 124 to control each of the AGC threshold voltages 126a-126c. The charge isolators 108, 122 isolate the control circuits from the receiver circuits to minimize electronic noise transfer. The charge isolators 108, 124 may be optical isolators, for example, which are known in the art. The AGC 120a-120c applies a control voltage to the pin diode attenuator 114a dependent on a power difference between the signal fed back through diode 118a-118c and the respective AGC threshold voltage applied via control lines 126a-126c, so that strong signals are attenuated by the pin diode attenuator 114a-114c.

Output from the LNAs 116a-116b is combined by a signal summer circuit 44, examples of which are well known in the art. The combined signal is fed in parallel via connections 128a and 128b to respective DC/tuners (for example, DTV tuner ICs) 130a-130b. As described above, the DC/tuners 130a and 130b are, for example, the Infineon Technologies TUA-6045 DTV tuner ICs. The combined signal is down sampled by the respective DC/tuners 130a, 130b in a manner known in the art to provide an intermediate frequency (IF) signal that is output via respective connections 131a and 131b to respective switch pairs 132a-134a and 132b-134b. The switch pairs 132a-134a and 132b-134b are respectively controlled in unison by the RF front end control 58 via signal lines 136a (Tuner Filter 1) and 136b (Tuner Filter 2) to select an IF filter, or to bypass the IF filters. In this example, the switch pairs 132a-134a and 132b-134b are three pole switches that are used to select one of two IF filters 138 or 140 and 142 or 144, respectively. The IF filters may be bypassed by moving the switch pairs 132a and 134a or 132b and 134b to a center position to select a respective filter bypass line 135a and 135b. The IF filters 138-144 are statically implemented to filter out all but a selected piece of the combined signal in order to reduce noise in the respective DC/tuners 130a and 130b. The respective filters are selected by the RF front end control 58 based on a piece of spectrum of interest. Although in this exemplary embodiment 2 IF filters are associated with each of the DC/tuners 130a and 130b, it should be understood that the invention is not limited to this exemplary implementation. Output from the respective switches 134a and 134b is fed back to the respective DC/tuners 130a and 130b via connections 137a and 137b.

A tuning function of each of the DC/tuners 130a and 130b is controlled by the RF front end control 58 via a respective data line (SDA) and a data clock line (SCL) to tune the respective DC/tuners to a particular piece of the IF signal returned via connections 137a and 137b. Timing signals output by a crystal oscillator (XTAL) 152 are used by the respective DC/tuners 130a, 130b for tuning functions in a manner well known in the art. Output from the respective DC/tuners 130a and 130b is passed through a respective balun 154a and 154b to a respective analog-to-digital (A/D) converter 156a and 156b which converts the respective analog signals output by the DC/tuners 130a and 130b to a digital representation of the output, in a manner well known in the art. The digital signals are output to the television band spectrum sensor 56, which processes the digital signals in accordance with a known white space sensor algorithm to detect television band white spaces.

Figure 8:
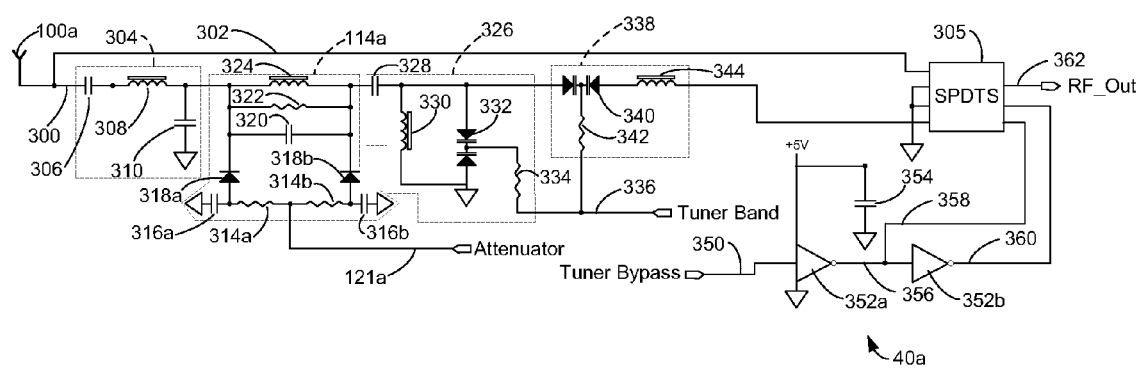
FIG. 8 is a schematic diagram of one implementation of an adaptive matching network of the radio frequency front end shown in FIG. 7.

FIG. 8 is a schematic diagram of one implementation of the adaptive matching network 40a of the radio frequency front end shown in FIG. 7. The antenna 100a is connected at 300 to the adaptive matching network 40a. A bypass connector 302 permits the adaptive matching network 40a to be bypassed. A single pole double throw switch (SPDTS) 305 controlled by the RF front end control 58 via tuner bypass 350 is used to select output from the adaptive matching network 40a or the bypass connector 302, as will be explained below in more detail.

In this embodiment, the adaptive matching network 40a includes an impedance transformer and low pass filter 304, the pin diode attenuator 114a, a shunt resonant block 326 and a series resonant block 338. The shunt resonant block 326 and the series resonant block 338 collectively form the tunable matching network 106a shown in FIG. 5. The impedance transformer and low pass filter 304 translates the impedance of the antenna 100a to a different impedance for maximum signal power transfer. The impedance transformer and low pass filter 304 includes a series connected capacitor 306 and inductor 308, and a branched capacitor 310 connected to ground, a value of each of which is selected in a manner known in the art to perform the desired impedance translation. The pin diode attenuator 114a is controlled by a control voltage output by the AGC 120a to a control line 121a. The control voltage is applied to interconnected resistor 314a, 314b and capacitor/ground 316a, 316b circuits that are respectively connected to diodes 318a and 318b which prevent current flow to the AGC 120a. The control voltage is applied to opposite terminals of a capacitor 320, a resistor 322, and an inductor 324 to attenuate or boost a received signal, as desired. Output of the pin diode attenuator 114a flows to the shunt resonant block 326 which prevents the received signal from shunting to ground.

The shunt resonant block 326 includes a capacitor 328 having its output terminal connected to parallel connected inductor 330 and varactor 332. Capacitance of the varactor 332 is controlled by control voltage applied by the RF front end control 58 to a Tuner Band conductor 336 connected to a resistor 334. The series resonant block 338 boosts the received signal. The series resonant block 338 includes a varactor 340 connected in series with an inductor 344. The Tuner Band 336 control voltage is applied through resistor 342 to control a capacitance of the varactor 340. The Tuner Band 336 control voltage is selected by the RF front end control 58 using, for example, a lookup table (not shown) to dynamically tune the antenna 100a to a desired piece of the television band spectrum. The component values for the components of the shunt resonant block 326 and the series resonant block 338 are selected, for example, using a Smith Chart in a manner known in the art.

As explained above, selection of the adaptive matching network 40a or the bypass 302 is controlled by the RF front end control 58, which applies a control voltage to a Tuner Bypass 350 connected to series connected inverters 352a and 352b. The inverter 352a is coupled to a capacitor 354. When the Tuner Bypass 350 is driven low, the inverter 352a drives lines 356 and 358 high and the inverter 352b drives line 360 low, which causes the SPDTS 304 to switch output of the adaptive matching network 40a to RF_Out 362. When Tuner Bypass 350 is driven high, the inverter 352a drives lines 356 and 358 low and inverter 352b drives line 360 high, which causes the SPDTS 304 to switch output of the bypass 302 to RF_Out 362. Thus, the RF front end control 58 is afforded complete control of the adaptive matching network 40a.

Figure 9:
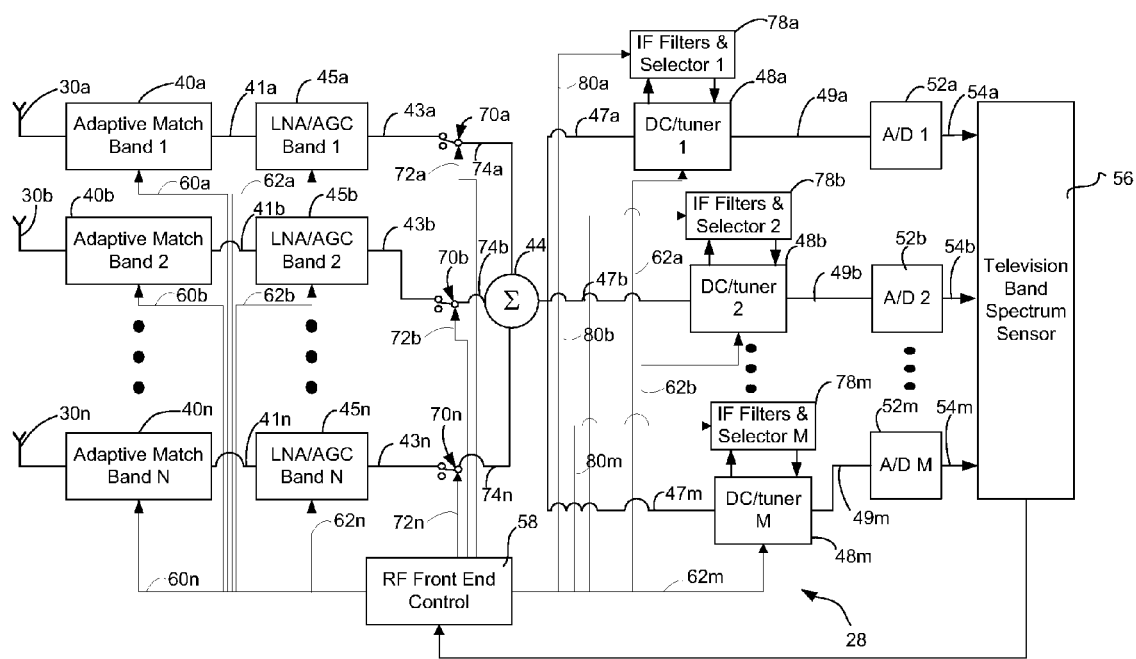
FIG. 9 is a schematic diagram of another embodiment of a radio frequency front end in accordance with the invention for a television band receiver provisioned with a sensor for identifying television band white spaces.

FIG. 9 is a schematic diagram of another embodiment of the radio frequency front end 28 in accordance with the invention. This embodiment is the similar to the embodiment described above with reference to FIGS. 1a and 2-5, except that the AGC/LNA circuits 42a-42n are replaced by LNA/AGC circuits 45a-45n. It has been determined that signal detection performance can be yet further improved, especially in very noisy environments, if the received signal is amplified by the low noise amplifier (LNA) prior to received signal treatment by the AGC (pin diode attenuator). This configuration of the radio frequency front end 28 will be explained below in more detail with reference to FIGS. 11-14. All other components of the radio frequency front end 28 are the same as those described above with reference to FIGS. 1a and 2-5 and that description will not be repeated.

Figure 10:
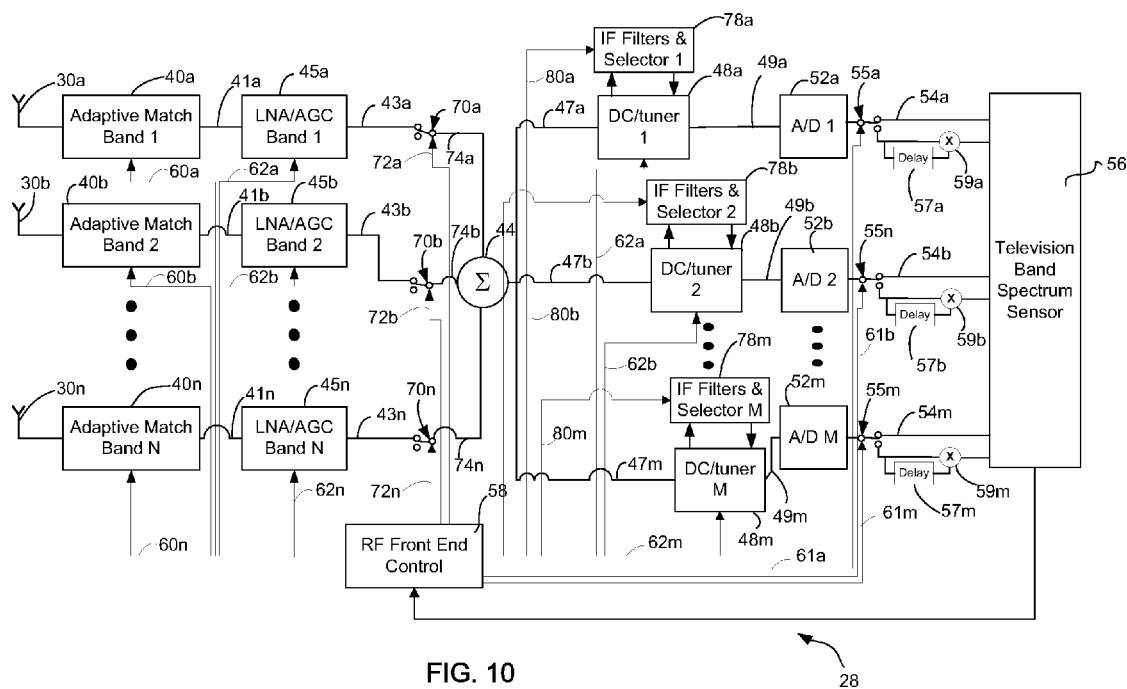
FIG. 10 is a schematic diagram of the embodiment of the radio frequency front end shown in FIG. 9 with cyclostationary feature detection.

FIG. 10 is a schematic diagram of the embodiment of the radio frequency front end shown in FIG. 9 with cyclostationary feature detection. The detection of a very low power signal about which no structure is known is the basis of an area of study called Low Probability of Detection/Low Probability of Interference (LPD/LPI) communications. In situations where energy detectors, such as the radio frequency front end 28, detection may be enhanced using cyclostationary feature detection. It has been determined that a radio frequency front end 28 with cyclostationary feature detection shown in FIG. 10 may detect the presence of a signal 30 dB below its in-band noise floor.

The radio frequency front end 28 with cyclostationary feature detection exploits the fact that in a manmade signal some periodic repetition is always present. This periodicity may be the bit rate used, the chip rate used (in direct sequence spread spectrum), or the frame rate used. While there is no spectral "tone" in the actual signal, a spectral "tone" is created through a non-linear operation on the received signal.

One implementation of this non-linear operation is a delay and multiply operation shown in FIG. 10. The output of the A/D converters 52a-52m is delayed by a delay circuit 57a-57m by approximately one half of a period of the underlying bit rate, chip rate, or frame rate. The delayed signal is then multiplied with a current sample of the (A/D) output by a multiplier circuit 59a-59m. The actual delay time created by the delay circuits 57a-57m is not critical. One half of the underlying period maximizes the "tone" to self-interference (noise) ratio, but the ratio tends to be insensitive to actual delay time. The "tone" appears at a frequency corresponding to the bit rate, the chip rate, or the frame rate.

The radio frequency front end 28 with cyclostationary feature detection requires a dynamic range that can "reach" down into the noise to detect a weak signal. Consequently, the (A/D) converters 52a-52m must have a reasonably large dynamic range.

In this embodiment, the cyclostationary feature detection can be bypassed under control of the RF front end control 58, which applies appropriate control voltages to control lines 61a-61m to control bi-pole switches 55a-55m to shunt the output of the (A/D) converters 52a-52m directly to the television band spectrum sensor 56 via respective signal lines 54a-54m when the cyclostationary feature detection is to be bypassed.

Figure 11:
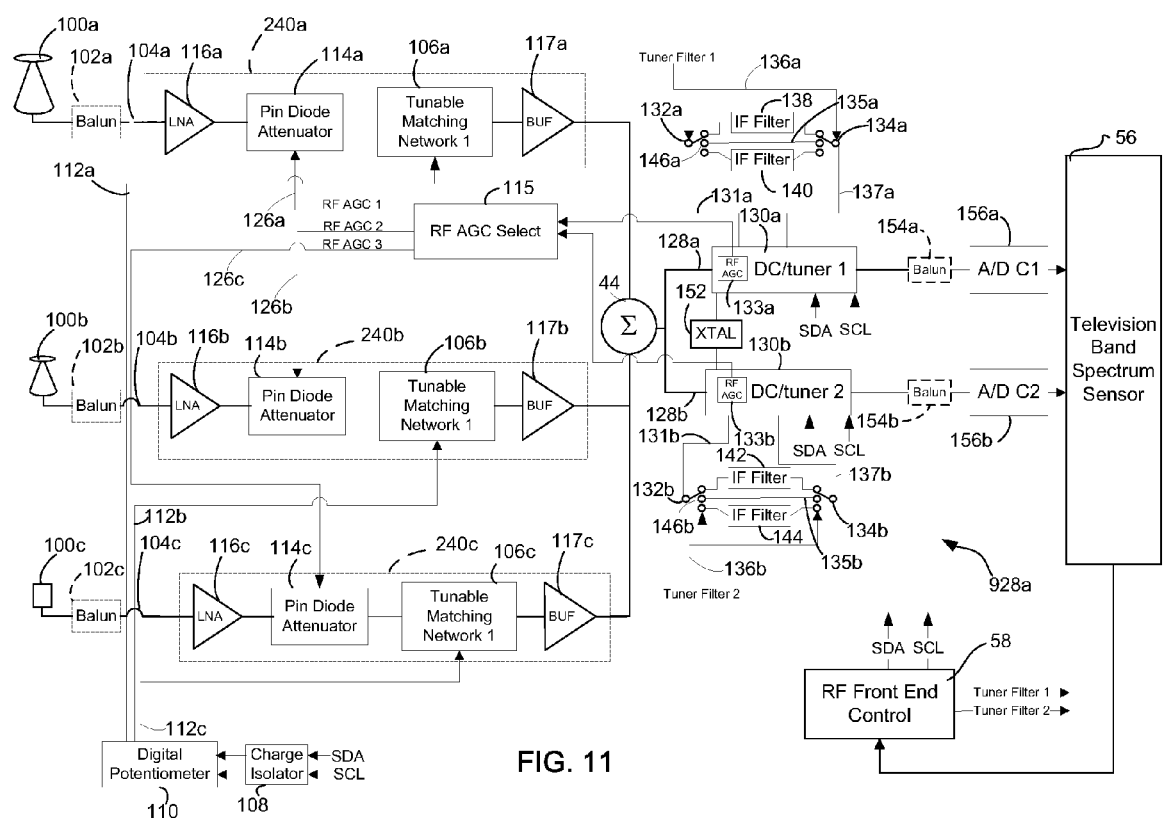
FIG. 11 is a schematic diagram of one implementation of the radio frequency front end shown in FIGS. 9 and 10.

FIG. 11 is a schematic diagram of one implementation of the radio frequency front end 28 shown in FIGS. 9 and 10. In this implementation, a radio frequency front end 928a includes respective LNA/AGC/matching networks 240a-240c. The LNA/AGC/matching networks 240a-240c include low noise amplifiers (LNAs) 116a-116c. The (LNAs) 116a-116c provide a 20-30 bB gain to the radio frequency signal outputs of respective antennas 100a-100c, which they receive via optional baluns 102a-102c. Pin diode attenuator circuits 114a-114c are respectively connected to the output ends of the LNAs 116a-116c. Attenuation control lines (RF AGC 1-3) 126a-126c are respectively connected to the respective pin diode attenuator circuits 114a-114c. In this embodiment the control lines 126a-126c are respectively connected to an RF AGC selector 115, used to switch the output of control voltages received from RF AGC circuits embedded in the respective tuner ICs 130a, 130b. Control of the RF AGC selector 115 may be manual, i.e. preset using dipole switches, for example, or they may be dynamically controlled by the RF front end control 58 in a manner well known in the art. The attenuated RF output of the respective pin diode attenuators 114a-114c is passed to respective tunable matching networks 106a-106c as will explained below in more detail with reference to FIGS. 17 and 18. Each tunable matching network 106a-106c is respectively connected to the input end of a buffer amplifier 117a-117c. The buffer amplifiers 117a-117c respectively buffer the input signals to a higher level for the tuner circuits 130a, 130b, which have a higher noise floor than the RF antenna signals. In all other respects this implementation is the same as the one described above with respect to FIG. 7 and it will not be further described.

Figure 12:
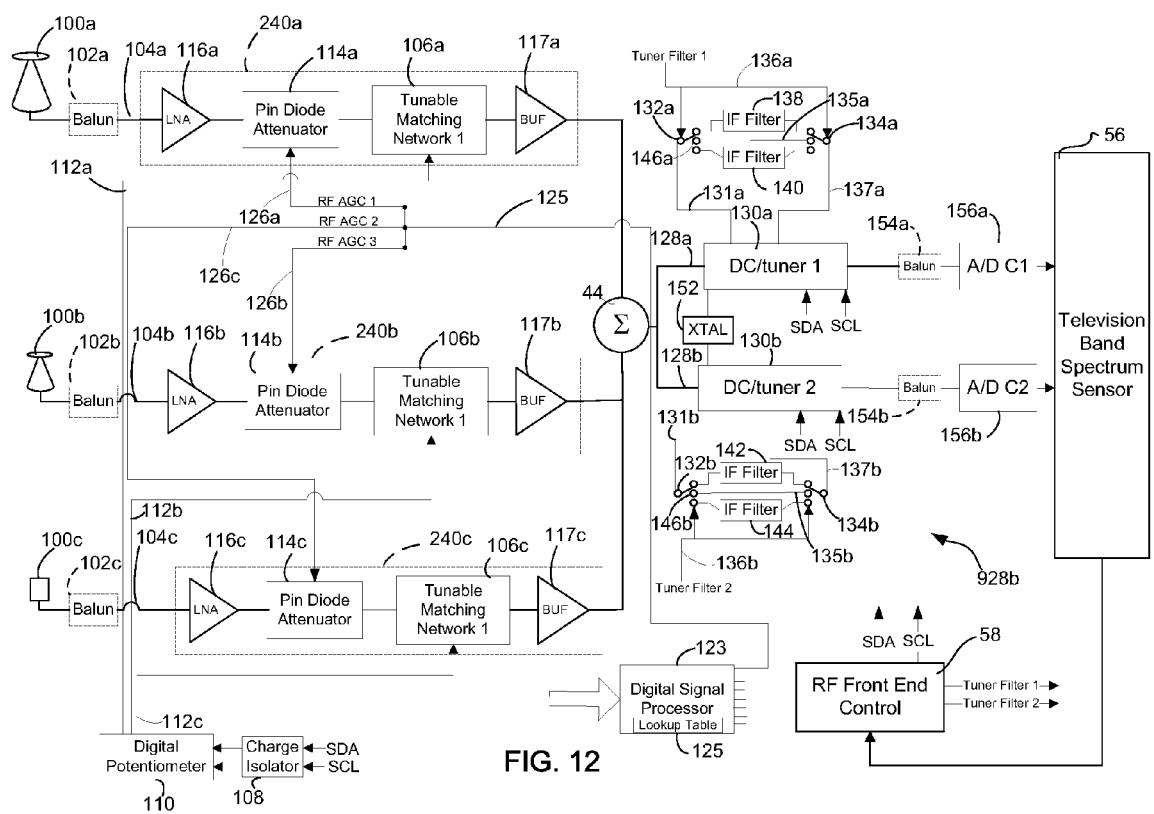
FIG. 12 is a schematic diagram of another implementation of the radio frequency front end shown in FIGS. 9 and 10.

FIG. 12 is a schematic diagram of another implementation of the radio frequency front end 28 shown in FIGS. 9 and 10. In this implementation a digital signal processor (DSP) 123 of RF front end 928b sets directly the RF AGC 126a-126c without using signal feedback. The DSP 123 is provided samples of a number of on board voltages. For example, the pin diode attenuator control voltages 126a-126c; intermediate frequency (IF) AGC control voltages, and reference voltages. The DSP 123 uses these voltages to compute an appropriate AGC control. In one embodiment, the DSP 123 maps the monitored voltages into a lookup table to determine an attenuation (in dB) for the pin diode attenuators 114a-114c, which is translated into an appropriate RF AGC control voltage. In all other respects this embodiment is the same as the embodiment shown in FIG. 11.

Figure 13:
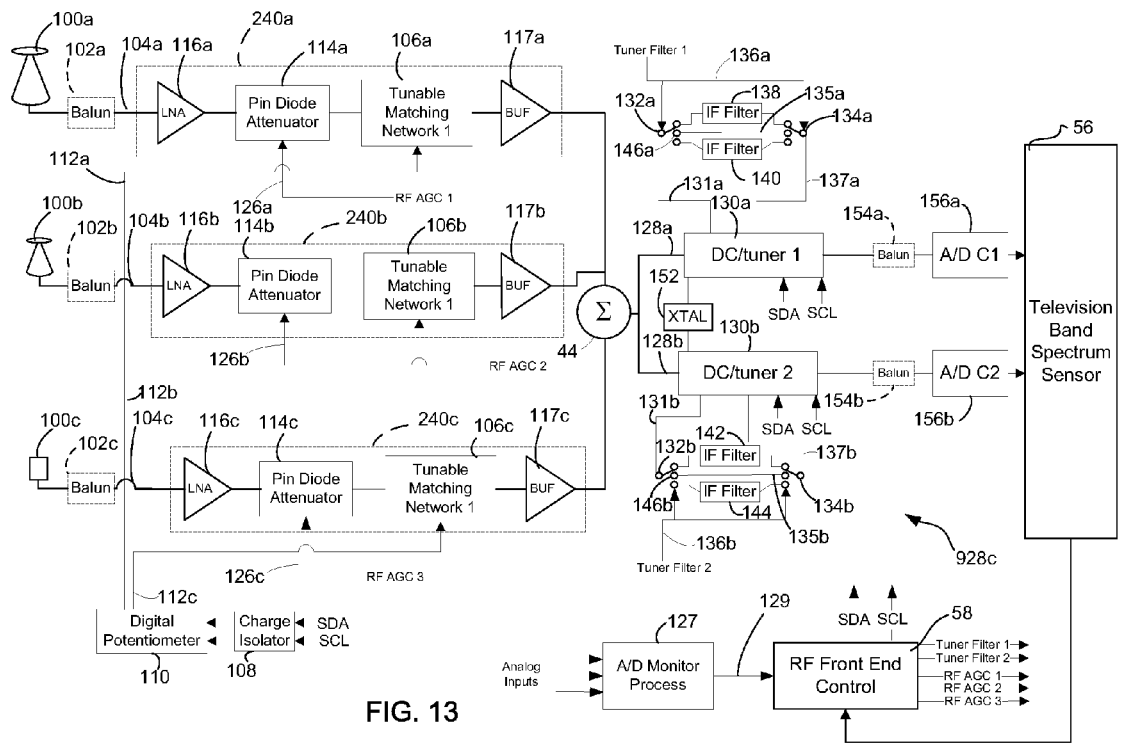
FIG. 13 is a schematic diagram of a further implementation of the radio frequency front end shown in FIGS. 9 and 10.

FIG. 13 is a schematic diagram of a further implementation of the radio frequency front end shown in FIGS. 9 and 10. In this implementation a RF front end 928c runs an (A/D) monitor process 127 that monitors various analog inputs, for example the analog inputs described above with reference to FIG. 12. The A/D monitor process 127 then computes an RF AGC which it outputs via line 129 to the RF front end control 58. The RF front end control 58 translates the RF AGC to a control voltage applied to respective control voltage lines 126a-126c to control the respective pin diode attenuators 114a-114c. In all other respects this embodiment is the same as the embodiment shown in FIG. 11.

Figure 14:
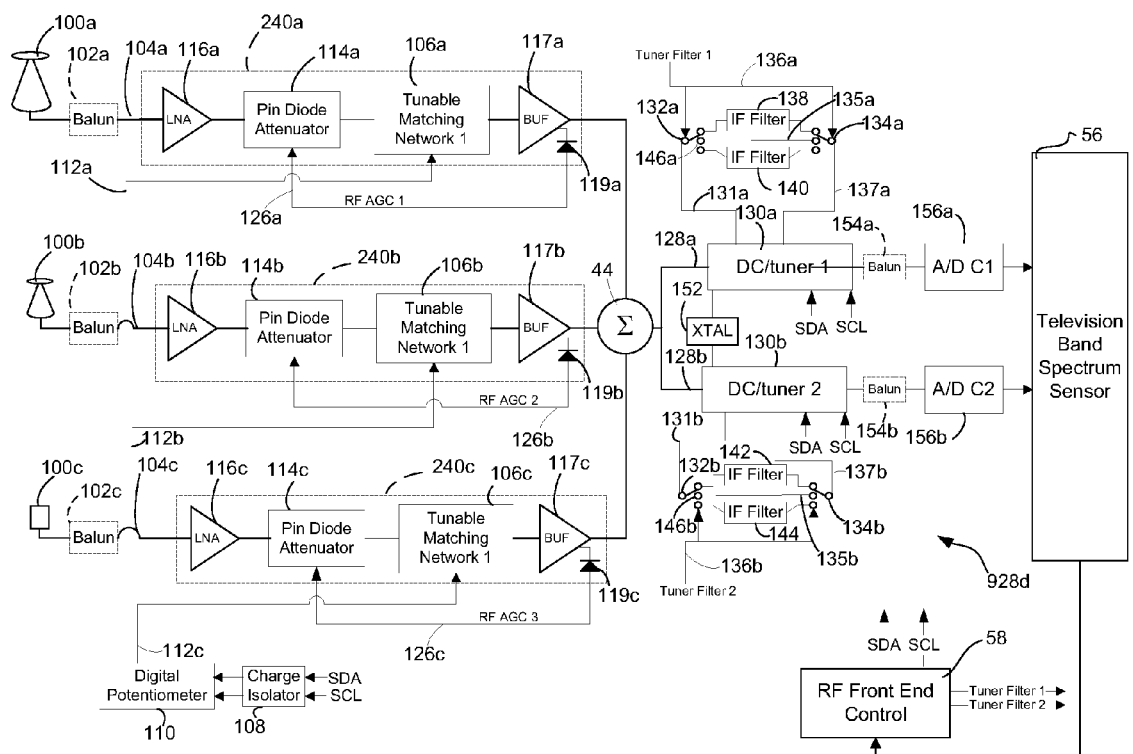
FIG. 14 is a schematic diagram of yet a further implementation of the radio frequency front end shown in FIGS. 9 and 10.

FIG. 14 is a schematic diagram of yet a further implementation of the radio frequency front 28 end shown in FIGS. 9 and 10. In this implementation an RF front end 928d generates RF AGC control voltages using the buffer amplifiers 117a-117c to directly control attenuation by the pin diode attenuator circuits 114a-114c. Diodes 119a-119c respectively prevent feedback to the buffer amplifiers 117a-117c. In all other respects this embodiment is the same as the embodiment shown in FIG. 11.

Figure 15:
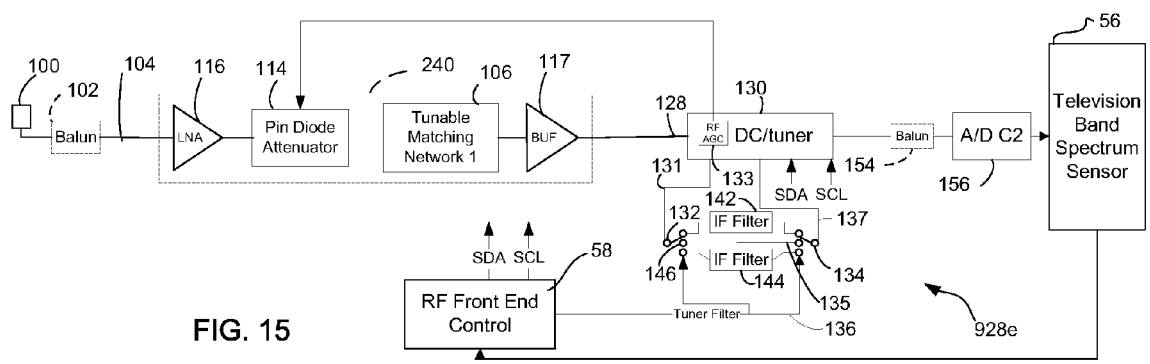
FIG. 15 is a schematic diagram of an example of a single band implementation of the radio frequency front end shown in FIG. 9.

FIG. 15 is a schematic diagram of an example of a single band implementation of the radio frequency front end 28 shown in FIG. 9. In this implementation a RF front end 928e has only one antenna 100 that is adapted to receive RF signals around a frequency of interest. The antenna 100 may be any known type of antenna that is suitable for the desired frequency band. The pin diode attenuator 114 may also be set to a predetermined attenuation level by applying a fixed RF AGC control voltage in a manner well known in the art. The tunable matching network 106 is controlled by the RF front end control 58 to tune the antenna 100 to the frequency of interest. The buffer amplifier 117 applies a predetermined boost to the received RF signal as described above with reference to FIG. 11. The other components of the RF front end 928e are as described above and will not be further described.

Figure 16:
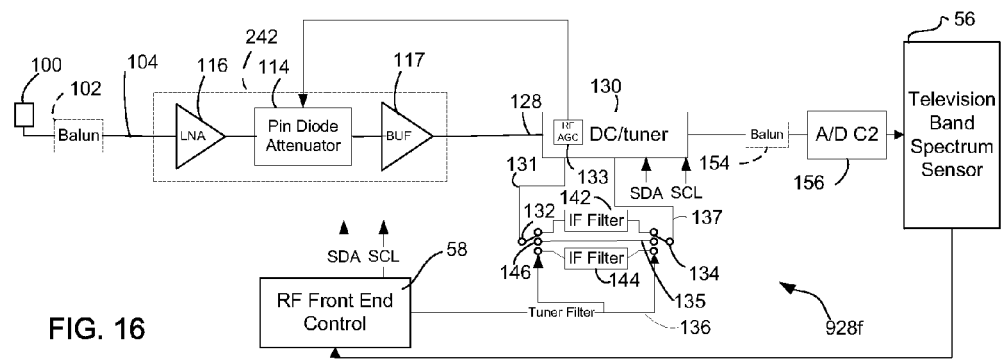
FIG. 16 is a schematic diagram of another example of a single band implementation of the radio frequency front end shown in FIG. 9.

FIG. 16 is a schematic diagram of another example of a single band implementation of the radio frequency front end 28 shown in FIG. 9. In this implementation an RF front end 928f is the same as the one described above with reference to FIG. 14, except that the tunable matching network is omitted to reduce cost. The other components of the RF front end 928f are as described above and will not be further described.

Figure 17:
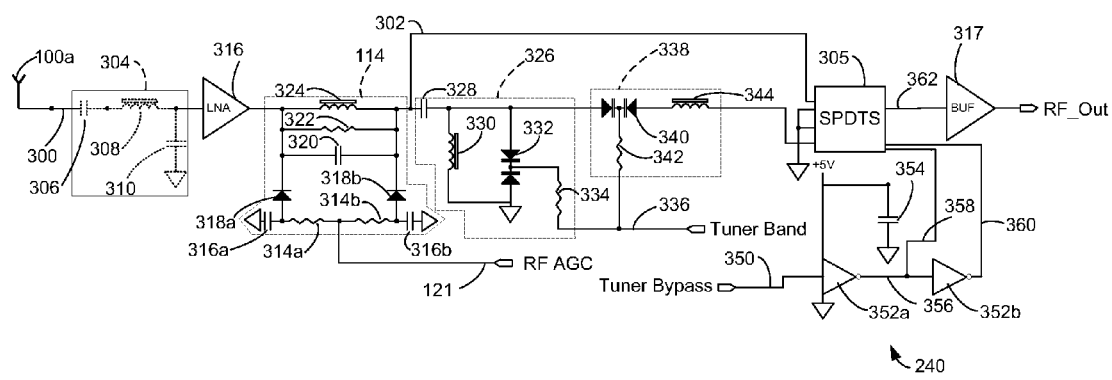
FIG. 17 is a schematic diagram of one implementation of a received signal amplification/attenuation stage and an adaptive matching network of the radio frequency front end shown in FIGS. 11-16.

FIG. 17 is a schematic diagram of one implementation of a received signal amplification/attenuation stage and an adaptive matching network of the radio frequency front end shown in FIGS. 11-15. The antenna 100a is connected at 300 to an optional impedance transformer and low pass filter 304, which is in turn connected to the LNA 316 that amplifies the RF signal received by the antenna 100 as described above. The optional impedance transformer and low pass filter 304 translates the impedance of the antenna 100a to a different impedance for maximum signal power transfer. The impedance transformer and low pass filter 304 includes a series connected capacitor 306 and inductor 308, and a branched capacitor 310 connected to ground, a value of each of which is selected in a manner known in the art to perform the desired impedance translation.

The output pin of the LNA 316 is connected to the pin diode attenuator 114. The pin diode attenuator 114 is controlled by the RF AGC control voltage output to a control line 121. The control voltage is applied to interconnected resistors 314a, 314b and capacitor/ground circuits 316a, 316b that are respectively connected to diodes 318a and 318b which prevent current flow to the RF AGC control line. The control voltage is applied to opposite terminals of a capacitor 320, a resistor 322, and an inductor 324 to attenuate or boost a received signal, as desired. Output of the pin diode attenuator 114 flows to a shunt resonant block 326 which prevents the received signal from shunting to ground.

The shunt resonant block 326 and a series resonant block 338 collectively form the tunable matching networks 106 shown in FIGS. 11-16. The shunt resonant block 326 includes a capacitor 328 having its output terminal connected to parallel connected inductor 330 and varactor 332. Capacitance of the varactor 332 is controlled by control voltage applied by the RF front end control 58 to a Tuner Band conductor 336 connected to a resistor 334. The series resonant block 338 boosts the received signal. The series resonant block 338 includes a varactor 340 connected in series with an inductor 344. The Tuner Band 336 control voltage is applied through resistor 342 to control a capacitance of the varactor 340. The Tuner Band 336 control voltage is selected by the RF front end control 58 using, for example, a lookup table (not shown) to dynamically tune the antenna 100a to a desired piece of the television band spectrum. The component values for the components of the shunt resonant block 326 and the series resonant block 338 are selected, for example, using a Smith Chart in a manner known in the art.

A bypass connector 302 permits the adaptive matching network 40a to be bypassed. A single pole double throw switch (SPDTS) 305 controlled by the RF front end control 58 via tuner bypass 350 is used to select output from the adaptive matching network 40a or the bypass connector 302, as will be explained below in more detail.

As explained above, selection of the tunable matching network or the bypass 302 is controlled by the RF front end control 58, which applies a control voltage to a Tuner Bypass 350 connected to series connected inverters 352a and 352b. The inverter 352a is coupled to a capacitor 354. When the Tuner Bypass 350 is driven low, the inverter 352a drives lines 356 and 358 high and the inverter 352b drives line 360 low, which causes the SPDTS 304 to switch output of the adaptive matching network 40a to RF_Out 362. When Tuner Bypass 350 is driven high, the inverter 352a drives lines 356 and 358 low and inverter 352b drives line 360 high, which causes the SPDTS 304 to switch output of the bypass 302 to RF_Out 362. Thus, the RF front end control 58 is afforded complete control of the tunable matching network 106.

Figure 18:
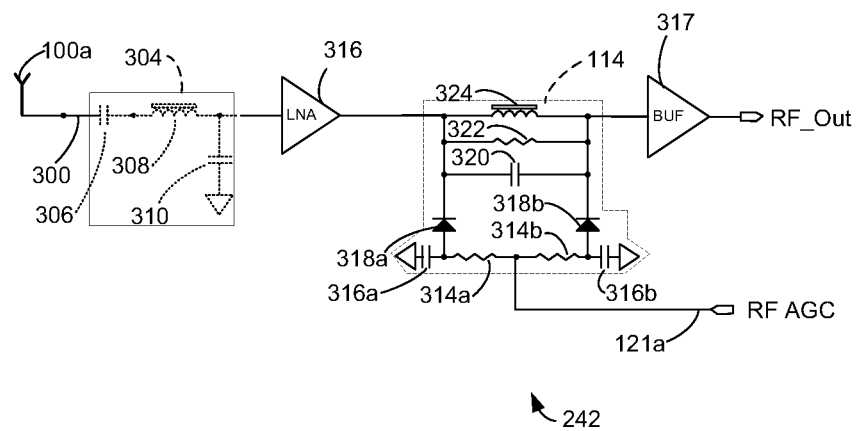
FIG. 18 is a schematic diagram of another implementation of a received signal amplification/attenuation stage for the radio frequency front ends shown in FIGS. 11-16.

FIG. 18 is a schematic diagram of an implementation of a received signal amplification/attenuation stage 242 for the radio frequency front end 928f shown in FIG. 16. This implementation does not include the tunable matching network 106 or the tuner bypass control circuit. Otherwise, it is the same as the implementation described above with reference to FIG. 17.

The embodiments of the invention described above are intended to be exemplary only of the radio frequency front end for a television band receiver and spectrum sensor in accordance with the invention. The scope of the invention is therefore intended to be limited only by the scope of the appended claims.

We claim:

1. A radio frequency front end for a television band receiver and spectrum sensor, comprising:
    a radio frequency antenna adapted to receive television band signals;
    a low noise amplifier that amplifies a received signal output of the radio frequency antenna;
    a pin diode attenuator circuit that selectively attenuates an output of the low noise amplifier;
    a buffer amplifier that amplifies an output of the pin diode attenuator;
    a downconverter/tuner that receives an output of the buffer amplifier; and
    an analog to digital converter which receives an output of the downconverter/tuner and provides an digital output signal.

2. The radio frequency front end as claimed in claim 1 further comprising an attenuation control line connected to the pin diode attenuator circuit.

3. The radio frequency network as claimed in claim 2 further comprising an integrated tuner circuit that applies an automatic gain control voltage to the attenuation control line.

4. The radio frequency front end as claimed in claim 2 further comprising a digital signal processor that computes an attenuation in decibels that is converted to an automatic gain control voltage to be applied to the attenuation control line.

5. The radio frequency front end as claimed in claim 4 further comprising a lookup table used by the digital signal processor to compute the attenuation that is converted to the automatic gain control voltage to be applied to the attenuation control line.

6. The radio frequency front end as claimed in claim 2 further comprising an analog-to-digital converter monitor process that computes attenuation in decibels that is converted to an automatic gain control voltage to be applied to the attenuation control line.

7. The radio frequency front end as claimed in claim 6 further comprising a lookup table used by the analog-to-digital converter monitor process to compute the attenuation in decibels that is converted to the automatic gain control voltage to be applied to the attenuation control line.

8. The radio frequency front end as claimed in claim 2 further comprising a feedback circuit between the buffer amplifier and the pin diode attenuator that applies the automatic gain control voltage to the attenuation control line.

9. The radio frequency front end as claimed in claim 1 further comprising a radio frequency front end control that controls a tuning function of the downconverter/tuner.

10. The radio frequency front end as claimed in claim 9 further comprising a television band spectrum sensor that receives the digital output signal of the analog to digital converter and that directs the radio frequency front end control.

11. The radio frequency front end as claimed in claim 9 wherein the downconverter/tuner comprises a DTV tuner integrated circuit.

12. The radio frequency front end as claimed in claim 1 further comprising a tunable matching network that tunes the radio frequency antenna to a signal band of interest.

13. The radio frequency front end as claimed in claim 12 wherein the tunable matching network comprises:
    an impedance translation circuit that translates an impedance of the antenna into a different impedance;
    a shunt resonant circuit that inhibits the received signal band of interest from shunting to ground; and
    a series resonant circuit that amplifies the received signal band of interest.

14. The radio frequency front end as claimed in claim 13 further comprising a radio frequency front end control that applies a control voltage to the shunt resonant circuit and the series resonant circuit to tune the antenna to the signal band of interest.

15. The radio frequency front end as claimed in claim 10 further comprising an analog to digital converter that converts an intermediate frequency signal output by the down converter/tuner into a digital signal.

16. The radio frequency front end as claimed in claim 15 further comprising a delay and multiply circuit that processes the digital signal and passes the processed digital signal to the television band spectrum sensor.

17. A method of sensing a television band for white space, comprising:
- tuning an antenna to receive a predetermined piece of television band spectrum;
- amplifying the received piece of television band spectrum using a low noise amplifier to output an amplified piece of television band spectrum;
- selectively attenuating the amplified piece of television band spectrum;
- passing the amplified and selectively attenuated piece of television band spectrum to a downconverter/tuner that receives the amplified and selectively attenuated piece of television band spectrum;
- converting an output of the downconverter/tuner into a digital signal; and
- passing the digital signal to a spectrum sensor that searches the digital signal for the white space.

18. The method as claimed in claim 17 wherein selectively attenuating the amplified piece of television band spectrum comprises using a pin diode attenuator to selectively attenuate the amplified piece of television band spectrum.

19. The method as claimed in claim 17 further comprising combining at least two pieces of the amplified and selectively attenuated piece of television band spectrum into a combined signal and passing the combined signal to each of a plurality of downconverter/tuners.

20. The method as claimed in claim 18 further comprising converting output of each of the second plurality of downconverter/tuners using an analog-to-digital converter directly connected to a respective one of each of the plurality of downconverter/tuners.

21. The method as claimed in claim 19 wherein converting the output of each of the plurality of downconverter/tuners comprises combining the output of each of the plurality of downconverter/tuners, and converting the combined output of the plurality of downconverter/tuners using a single analog-to-digital converter.

22. The method as claimed in claim 19 further comprising:
- passing an intermediate frequency output of each of the plurality of downconverter/tuners to a respective one of a corresponding plurality of intermediate frequency filter selectors;
- controlling each of the corresponding plurality of intermediate filter selectors to select an intermediate frequency filter to filter the output;
- passing the output through the selected intermediate frequency filter; and
- returning the filtered output to each of the respective ones of the plurality of downconverter/tuners.

23. A radio frequency front end for a television band receiver and spectrum sensor, comprising:
- at least two radio frequency antennas adapted to receive television band signals;
- at least two low noise amplifiers (LNAs), each LNA amplifying a received signal output of a respective one of the radio frequency antennas;
- at least two pin diode attenuator circuits, each pin diode attenuator circuit selectively attenuating an output of a respective one of the low noise amplifiers; and
- at least two buffer amplifiers, each buffer amplifier amplifying an output of a respective one of the pin diode attenuator circuits.

24. The radio frequency front end as claimed in claim 23 further comprising at least two attenuation control lines, each attenuation control line being connected to a respective one of the pin diode attenuator circuits.

25. The radio frequency network as claimed in claim 24 further comprising at least one integrated tuner circuit that applies an automatic gain control voltage to respective ones of the attenuation control lines.

26. The radio frequency front end as claimed in claim 24 further comprising a digital signal processor that computes an attenuation in decibels that is converted to an automatic gain control voltage to be applied to respective ones of the attenuation control lines.

27. The radio frequency front end as claimed in claim 26 further comprising a lookup table used by the digital signal processor to compute the attenuation in decibels that is converted to the automatic gain control voltage to be applied to the respective ones of the attenuation control lines.

28. The radio frequency front end as claimed in claim 24 further comprising an analog-to-digital converter monitor process that computes an attenuation in decibels that is converted to an automatic gain control voltage to be applied to the respective ones of the attenuation control lines.

29. The radio frequency front end as claimed in claim 28 further comprising a lookup table used by the analog-to-digital converter monitor process to compute the attenuation in decibels that is converted to the automatic gain control voltage to be applied to the respective ones of the attenuation control lines.

30. The radio frequency front end as claimed in claim 24 further comprising a feedback circuit between the respective ones of the buffer amplifiers and corresponding respective ones of the pin diode attenuator circuits to apply the automatic gain control voltage to a corresponding one of the respective attenuation control lines.

31. The radio frequency front end as claimed in claim 23 further comprising a radio frequency front end control that controls a tuning function of at least two downconverter/tuners.

32. The radio frequency front end as claimed in claim 31 further comprising a television band spectrum sensor that directs the radio frequency front end control.

33. The radio frequency front end as claimed in claim 31 wherein the at least two downconverter/tuners respectively comprise DTV tuner integrated circuits.

34. The radio frequency front end as claimed in claim 33 further comprising at least two tunable matching networks that tune a respective one of the at least two radio frequency antennas to a respective signal band of interest.

35. The radio frequency front end as claimed in claim 34 wherein the respective tunable matching networks comprise:
- an impedance translation circuit that translates an impedance of a corresponding one of the at least two radio frequency antennas into a different impedance;
- a shunt resonant circuit that inhibits the received signal band of interest from shunting to ground; and
- a series resonant circuit that amplifies the received signal band of interest.

36. The radio frequency front end as claimed in claim 35 further comprising a radio frequency front end control that applies a control voltage to the shunt resonant circuit and the series resonant circuit to tune the corresponding one of the at least two antennas to the respective signal bands of interest.

37. The radio frequency front end as claimed in claim 32 further comprising at least one analog to digital converter that converts an intermediate frequency signal output by the at least two down converter/tuners into at least one digital signal.

38. The radio frequency front end as claimed in claim 37 further comprising at least one delay and multiply circuit that processes a corresponding one of the at least one of the digital signals and passes the at least one processed digital signal to the television band spectrum sensor.

\* \* \* \* \*